United States Patent
Combrink et al.

(10) Patent No.: US 7,861,499 B2
(45) Date of Patent: Jan. 4, 2011

(54) FILLING MACHINE FOR OPEN, SEALABLE SACKS

(75) Inventors: Alois Combrink, Oelde (DE); Josef Van Bergerem, Ennigerloh (DE)

(73) Assignee: Haver & Boecker oHG, Oelde (DE)

( * ) Notice: Subject to any disclaimer, the term of this patent is extended or adjusted under 35 U.S.C. 154(b) by 84 days.

(21) Appl. No.: 12/300,228

(22) PCT Filed: Mar. 7, 2007

(86) PCT No.: PCT/EP2007/052121
§ 371 (c)(1),
(2), (4) Date: Nov. 10, 2008

(87) PCT Pub. No.: WO2007/128600
PCT Pub. Date: Nov. 15, 2007

(65) Prior Publication Data
US 2009/0205293 A1   Aug. 20, 2009

(30) Foreign Application Priority Data
May 9, 2006   (DE) .......... 10 2006 021 850

(51) Int. Cl.
*B65B 31/04* (2006.01)
(52) U.S. Cl. .............. 53/512; 53/79; 53/267; 53/284.7
(58) Field of Classification Search .......... 53/570, 53/241, 249, 267, 268, 284.7, 79, 111 R, 53/510, 512
See application file for complete search history.

(56) References Cited
U.S. PATENT DOCUMENTS

| | | | | |
|---|---|---|---|---|
| 3,708,952 A | * | 1/1973 | Schulze et al. ........... | 53/512 |
| 3,871,157 A | * | 3/1975 | Domke et al. ........... | 53/110 |
| 4,140,159 A | * | 2/1979 | Domke ................ | 141/129 |
| 4,182,386 A | * | 1/1980 | Alack ................. | 141/83 |
| 4,448,011 A | * | 5/1984 | Pohl .................. | 53/512 |
| 4,703,782 A | * | 11/1987 | Henkel, Sr. ........... | 141/65 |
| 5,195,298 A | * | 3/1993 | Baranowski ............ | 53/425 |

FOREIGN PATENT DOCUMENTS

| | | |
|---|---|---|
| AU | 454 509 B2 | 10/1974 |
| DE | 14 61 919 A1 | 2/1969 |
| DE | 1 948 228 | 4/1971 |
| DE | 21 16 090 | 10/1972 |
| DE | 2 204 783 | 8/1973 |

(Continued)

*Primary Examiner*—Paul R Durand
(74) *Attorney, Agent, or Firm*—Henry M. Feiereisen; Ursula B. Day

(57) ABSTRACT

A filling machine for open, sealable sacks includes a fill pipe for filling the attached sacks with contents having a tendency to develop dust, and a cleaning device which includes a blow rail for cleaning the inner faces of the sack mouth rim and side folds of a sack by an air flow which emerges from the blow rail. The blow rail is fastened to two-armed levers which can be pivoted about a stationary axis by means of a drive. As a result, the air jets are directed onto the surfaces to be cleaned from different directions during the cleaning process and the layers of the side folds are also separated from one another and cleaned. The filling machine is suitable, in particular, for filling powdery contents.

20 Claims, 1 Drawing Sheet

FOREIGN PATENT DOCUMENTS

| | | |
|---|---|---|
| DE | 25 37 728 | 4/1976 |
| DE | 82 11 985 U1 | 8/1982 |
| DE | 285 251 | 10/1983 |
| DE | 38 34 810 A1 | 4/1990 |
| FR | 1 600 451 | 9/1970 |
| GB | 1 088 875 | 10/1967 |
| GB | 1 265 892 A | 3/1972 |
| WO | WO 02/30755 A1 | 4/2002 |

\* cited by examiner

FILLING MACHINE FOR OPEN, SEALABLE SACKS

BACKGROUND OF THE INVENTION

The invention relates to a filling machine for open, sealable sacks, having a fill pipe for filling the attached sacks with contents that tend to develop dust, and at least one blow rail which is acted upon by compressed air and arranged preferably above the sack mouth rim for allowing dirt particles to be removed.

Filling machines of a type involved here fill various contents. Powdery contents in particular tend to develop dust during the filling operation. As sacks are made preferably of sealable material, it is absolutely necessary to keep at least the inner surfaces in the area of the welding seam free of dirt particles as otherwise leaks are encountered through which the material particles may escape.

Constructive measures on the fill pipe are known to protect the inner surfaces of the sack mouth rim from contamination during the filling operation. According to a standard configuration, each fill pipe is equipped with at least one suction pipe which can be connected to a dedusting unit. In this way, the surroundings of the filling machine should be kept as free of dust as possible.

When the filled sack is removed from the fill pipe, it is also known, while the clamping jaws are closed, to expose the sack mouth rim situated above the clamping jaws to air from a blow rail so as to expel adhering material particles.

In particular, when sacks of plastic film are involved, it is unavoidable that the so-called overhang comprised of both sack walls oftentimes does not open so that blow air is unable to reach the inner surfaces. In this case, cleaning is inadequate.

It is further known to move a blow element, preferably in the form of a blow finger, in longitudinal direction of the sack rim so that the air jet is guided between both layers of the sack mouth rim. This arrangement has in particular the drawback that the sack overhang must already be opened beforehand or spread apart in order to allow the blow element to dip into it. Moreover, this construction has also the drawback that at least one of both side folds is not sufficiently cleaned. Therefore, this solution has been shown inadequate in practice.

SUMMARY OF THE INVENTION

The invention is based on the object to so configure a filling machine of a type described in greater detail above as to be simple in structure and to allow a precise cleaning also of the inner surfaces of the sack mouth zone above the clamping jaws and also in the area of the side folds by the air stream exiting the blow rail.

The posed object is solved by movably supporting the blow rail by means of a drive.

The mobility of the blow rail ensures that the sack mouth rim above the closed clamping jaws is opened by the incident air jet so that the air jet impacts the inner surfaces to remove adhering dust or dirt particles. Especially advantageous is the separation also of the layers of the side folds through change of the air jet so that also this region can be precisely cleaned. The individual film layers are thus separated virtually in succession by the oscillating air stream and cleaned by the thus entering air stream.

The at least one blow rail is preferably movable by means of the drive with a movement component transversely or substantially transversal to the sack rim (there above), resulting in especially good cleaning results.

As an alternative or in addition, it is further advantageous when the at least one blow rail is rotatably or swingably movable by means of the drive about a preferably fixed horizontal axis.

According to a preferred configuration, the blow rail is rotatable or swingable by means of a drive about a fixed horizontal axis. A rotatable or swingable movement may also be implemented as an oscillating movement. The oscillating movement is preferably a linear movement which is produced by a respective drive. These movements of the suction rail afford the advantage that the blow air stream is able to impact the film overhang from various directions during the cleaning period to thereby effectuate an opening of the layers to thereby enhance the cleaning effect. The drive is hereby configured such that the angle or linear distance assumes a particular value or is adjustable.

According to an advantageous configuration, the blow rail is mounted on at least one two-armed lever and the drive is articulated to the other end of the two-armed lever.

According to another configuration, the drive is constructed as crank drive and the free end of the coupler is articulated to the two-armed lever or to the rod connecting the levers.

As an alternative to the crank drive, the drive may also be implemented as a controllable pneumatic piston and cylinder unit or an electric cylinder.

The cleaning apparatus is preferably configured as a component of the welding device. It is, however, also possible to place the blow rail upstream of the closing apparatus or the welding apparatus. Cleaning has then to take place before the welding jaws are closed. The sacks to be filled preferably by means of the filling machine according to the invention are constructed as gusseted plastic sacks. As contents are filled that especially tend to develop dust, it is also provided to equip the fill pipe with a suction apparatus which can be connected to a vacuum source during the filling operation so that the particles can be purposely returned, thereby straining the surroundings of the filling machine as little as possible.

In order to prevent the product from swirling up during cleaning with air, the cleaning station has two clamping jaws which screen the product against the cleaning air before the cleaning operation. The area of the sack above the content is thus flattened. This procedure is also labeled as pinch off process. The clamping jaws are typically configured as rods of round cross sections or tubes with circular ring-shaped cross sections to avoid the presence of edges that may cause damage to the sacks. The clamping jaws should be positioned directly above the upper content level, when closed.

Disposed downstream the fill pipe are preferably the stations required for further processing of the filled sacks. Provision is therefore made to equip the filling machine with a conveyor which can be operated incrementally and receives the filled sacks after their removal from the fill pipe.

BRIEF DESCRIPTION OF THE DRAWING

The invention will be described in greater detail with reference to the attached drawing.

It is shown in.

DETAILED DESCRIPTION OF PREFERRED EMBODIMENTS

Figure 1:
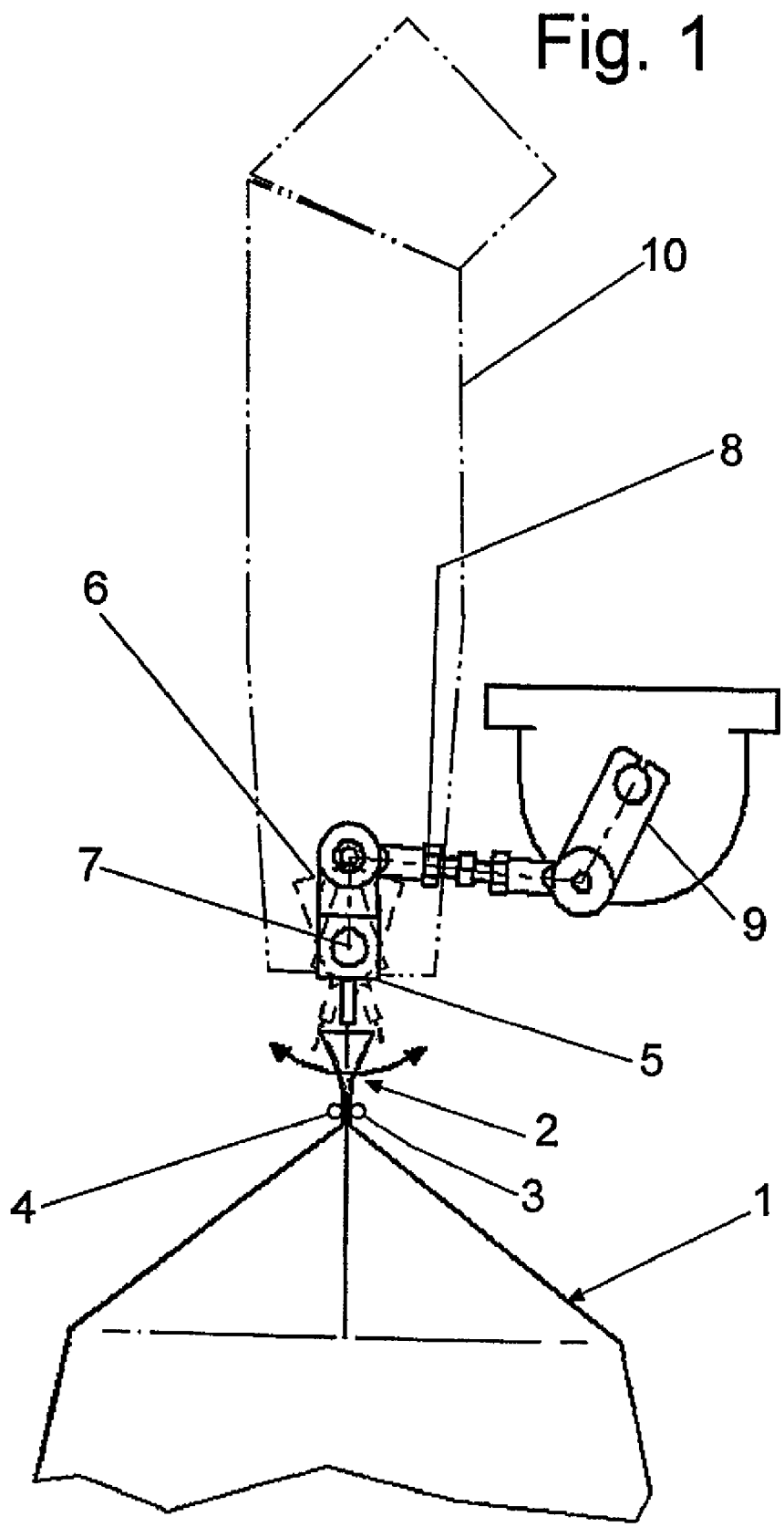
FIG. 1 a purely schematic vertical section of the cleaning apparatus of the filling machine according to the invention.

For ease of illustration, FIG. 1 illustrates only the cleaning apparatus of the filling machine according to the invention.

After being removed from the fill pipe of the filing machine, the filled sack 1 of sealable material is at first pinched off below the sack mouth rim 2 by controlled clamping jaws 3, 4 by closing them to thereby effect at least that the upper regions of the sack walls rest against the content.

An overhang of the sack still remains above the clamping jaws 3, 4 for dust and dirt particles to be able to stick to its inner surfaces. The cleaning apparatus includes a blow rail 5 provided with a multiplicity of openings in spaced-apart relationship through which air jets exit when compressed air is admitted. As a result, the sack mouth rim 2 is moved apart by the oscillating movement, as shown in FIG. 1, and also in the area of the side folds in the event gusseted sacks are involved.

As shown in FIG. 1, the air jets are conducted during the blowing operation from different directions onto the inner surfaces of the sack mouth rim 2 so as to attain an especially effective cleaning action. In order to change the directions of the air jets, the blow rail 5 is mounted in a manner not shown in greater detail in the illustrated exemplary embodiment to two two-armed levers 6 defining rotation axes designated by reference numeral 7.

The ends in opposition of the blow rail 5 are interconnected by a rod. The midsection of this rod is engaged by the coupler 8 of a crank drive. The opposite end of the coupler 8 is articulated to a crank 9 which is caused to rotate incrementally by a drive in a manner not shown in greater detail.

As a result, the two-armed levers 6 execute a pivot or oscillating movement about the stationary axis 7 so that the blow rail 5 is also pivoted accordingly. The supply of compressed air to the blow rail 5 is implemented via laterally arranged connections. Further associated to the blow rail 5 is a rectangular-shaped suction pipe 10.

The unillustrated sack attachment member includes spreading elements in order to open the approaching empty sack after pre-opening it by means of suction members. The empty sack is then attached to the fill pipe and secured by clamping jaws. The filling operation is then executed and, after removal, the afore-described cleaning apparatus is activated.

The oscillating or swinging movement of the blow rail 5 may also be realized by a linear drive, as opposed to the illustration according to FIG. 1, with the linear drive being articulated to the two-armed levers 6. Such a linear drive may be constructed as electric cylinder or also as a pneumatically-operated piston and cylinder unit.

The invention is not to be limited to the illustrated exemplary embodiment. What is important is that the swinging movement of the blow rail 5 causes the air jets, directed onto the inner surfaces of the sack mouth rim 2, to impact the inner surfaces in changing directions.

What is claimed is:

1. A filling machine for filling an open, sealable sack; comprising:
    a fill pipe for filling a sack with a content that tends to develop dust;
    at least one blow rail positioned in proximity of a sack mouth rim of a sack, said blow rail being constructed for admission of compressed air and expulsion of the compressed air to remove dirt particles; and
    a drive for movably supporting the blow rail,
    wherein the at least one blow rail is movable by the drive in a direction substantially transverse to the sack mouth rim.

2. The filling machine of claim 1, wherein the at least one blow rail is rotatably or swingably movable by means of the drive about a horizontal axis.

3. The filling machine of claim 2, wherein the horizontal axis is stationary.

4. The filling machine of claim 1, further comprising at least one two-armed lever having one end for attachment of the blow rail and another end for articulation of the drive.

5. The filling machine of claim 1, wherein the drive is implemented as crank drive.

6. The filling machine of claim 1, wherein the drive is implemented as linear drive.

7. The filling machine of claim 6, wherein the linear drive is an electric cylinder.

8. The filling machine of claim 1, wherein the linear drive is a pneumatically-operated piston and cylinder unit.

9. The filling machine of claim 1, further comprising an incrementally operated conveyor for removal of a filled sack.

10. A filling machine for filling an open, sealable sack; comprising:
    a fill pipe for filling a sack with a content that tends to develop dust;
    at least one blow rail positioned in proximity of a sack mouth rim of a sack, said blow rail being constructed for admission of compressed air and expulsion of the compressed air to remove dirt particles;
    a drive for movably supporting the blow rail; and
    a welding unit for sealing the sack mouth rim, said blow rail being part of a cleaning unit which is part of the welding unit.

11. The filling machine of claim 10, further comprising at least one two-armed lever having one end for attachment of the blow rail and another end for articulation of the drive.

12. The filling machine of claim 10, wherein the drive is implemented as crank drive.

13. The filling machine of claim 10, wherein the drive is implemented as linear drive.

14. The filling machine of claim 10, wherein the linear drive is a pneumatically-operated piston and cylinder unit.

15. The filling machine of claim 10, further comprising an incrementally operated conveyor for removal of a filled sack.

16. A filling machine for filling an open, sealable sack; comprising:
    a fill pipe for filling a sack with a content that tends to develop dust;
    at least one blow rail positioned in proximity of a sack mouth rim of a sack, said blow rail being constructed for admission of compressed air and expulsion of the compressed air to remove dirt particles;
    a drive for movably supporting the blow rail; and
    a welding unit for sealing the sack mouth rim, said blow rail being part of a cleaning unit which is constructed as a separate station positioned upstream of the welding unit.

17. The filling machine of claim 16, further comprising at least one two-armed lever having one end for attachment of the blow rail and another end for articulation of the drive.

18. The filling machine of claim 16, wherein the drive is implemented as crank drive.

19. The filling machine of claim 16, wherein the drive is implemented as linear drive.

20. The filling machine of claim 16, wherein the linear drive is a pneumatically-operated piston and cylinder unit.

* * * * *